United States Patent
Okamoto et al.

(10) Patent No.: US 11,766,827 B2
(45) Date of Patent: Sep. 26, 2023

(54) THREE-DIMENSIONAL SHAPED OBJECT MANUFACTURING DEVICE

(71) Applicant: SEIKO EPSON CORPORATION, Tokyo (JP)

(72) Inventors: Eiji Okamoto, Matsumoto (JP); Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 16/916,475

(22) Filed: Jun. 30, 2020

(65) Prior Publication Data
US 2021/0001547 A1    Jan. 7, 2021

(30) Foreign Application Priority Data
Jul. 3, 2019   (JP) .................. 2019-124378

(51) Int. Cl.
*B29C 64/165*    (2017.01)
*B29C 64/236*    (2017.01)
(Continued)

(52) U.S. Cl.
CPC .......... *B29C 64/165* (2017.08); *B29C 64/209* (2017.08); *B29C 64/236* (2017.08); *B29C 64/35* (2017.08); *B29C 64/393* (2017.08); *B33Y 30/00* (2014.12); *B33Y 40/00* (2014.12); *B33Y 50/02* (2014.12)

(58) Field of Classification Search
CPC ..... B29C 64/209; B29C 64/35; B29C 64/236; B29C 64/165; B29C 64/393; B22F 10/14; B22F 10/68; B22F 12/53; B22F 10/85; B22F 12/224; B22F 12/90; B41J 2/165; B41J 2/16517; B41J 2/1652; B33Y 30/00; B33Y 40/00; B33Y 40/20; B33Y 50/02
See application file for complete search history.

(56) References Cited

U.S. PATENT DOCUMENTS

| | | | |
|---|---|---|---|
| 7,862,320 B2 * | 1/2011 | Kumagai | B29C 64/165 425/375 |
| 10,220,604 B2 * | 3/2019 | Utsunomiya | B33Y 10/00 |

(Continued)

FOREIGN PATENT DOCUMENTS

| | | |
|---|---|---|
| CN | 104411499 | 3/2015 |
| JP | S57-131566 | 8/1982 |

(Continued)

*Primary Examiner* — Seyed Masoud Malekzadeh
(74) *Attorney, Agent, or Firm* — WORKMAN NYDEGGER

(57) ABSTRACT

A three-dimensional shaped object manufacturing device includes a shaping table, layer forming portions configured to form a powder layer on the shaping table, a head 3 configured to discharge, from a nozzle, a liquid containing a binder to a shaping region of a three-dimensional shaped object in the powder layer, and a control unit configured to control a movement of the head with respect to the shaping table and a drive of the head by applying a voltage, in which the control unit performs control to, after the liquid is discharged to the shaping region, execute a flushing operation of discharging the liquid from the nozzle to a flushing position different from the shaping region, and set an applied voltage during the flushing operation higher than an applied voltage when the liquid is discharged to the shaping region.

6 Claims, 6 Drawing Sheets

(51) Int. Cl.
  *B33Y 50/02*   (2015.01)
  *B29C 64/393*  (2017.01)
  *B33Y 30/00*   (2015.01)
  *B29C 64/35*   (2017.01)
  *B33Y 40/00*   (2020.01)
  *B29C 64/209*  (2017.01)

(56) References Cited

U.S. PATENT DOCUMENTS

| | | | |
|---|---|---|---|
| 10,328,633 B2* | 6/2019 | Yamazaki | B29C 64/112 |
| 10,449,720 B2* | 10/2019 | Utsunomiya | B29C 64/112 |
| 2005/0068364 A1* | 3/2005 | Kayanaka | B41J 2/165 347/23 |
| 2010/0191360 A1* | 7/2010 | Napadensky | B33Y 80/00 700/98 |
| 2016/0001504 A1 | 1/2016 | Ikeda et al. | |
| 2016/0167298 A1* | 6/2016 | Mantell | B29C 64/393 425/145 |
| 2017/0173879 A1* | 6/2017 | Myerberg | B22F 12/53 |
| 2017/0252820 A1* | 9/2017 | Myerberg | B22F 12/10 |
| 2017/0266963 A1* | 9/2017 | Garcia Alvarez | B41J 2/16579 |
| 2017/0315526 A1* | 11/2017 | Kim | B29C 64/209 |
| 2018/0178533 A1* | 6/2018 | Sakai | B22F 12/53 |
| 2018/0229433 A1* | 8/2018 | Lan | B22F 12/58 |
| 2018/0264731 A1* | 9/2018 | Kritchman | B29C 64/357 |
| 2018/0304370 A1* | 10/2018 | Myerberg | G05B 19/4099 |
| 2018/0354192 A1* | 12/2018 | Iwase | B33Y 40/00 |
| 2019/0030900 A1 | 1/2019 | Iwase | |
| 2019/0118258 A1* | 4/2019 | Sachs | B29C 64/209 |
| 2019/0126554 A1* | 5/2019 | Iwase | B29C 64/209 |
| 2019/0270253 A1* | 9/2019 | Levi | B29C 64/343 |
| 2020/0230871 A1 | 7/2020 | Ikeda et al. | |
| 2020/0331208 A1* | 10/2020 | Korol | B29C 64/393 |

FOREIGN PATENT DOCUMENTS

| | | |
|---|---|---|
| JP | 2002-036594 | 2/2002 |
| JP | 2008-132398 | 6/2008 |
| JP | 2014-008658 | 1/2014 |
| JP | 2016-016568 | 2/2016 |
| JP | 2016-155273 A | 9/2016 |
| JP | 2019-001010 A | 1/2019 |
| JP | 2019-077152 | 5/2019 |

* cited by examiner

THREE-DIMENSIONAL SHAPED OBJECT MANUFACTURING DEVICE

The present application is based on, and claims priority from JP Application Serial Number 2019-124378, filed Jul. 3, 2019, the disclosure of which is hereby incorporated by reference herein in its entirety.

BACKGROUND

1. Technical Field

The present disclosure relates to a three-dimensional shaped object manufacturing device.

2. Related Art

In the related art, various types of three-dimensional shaped object manufacturing devices are used. Among the devices, there is a three-dimensional shaped object manufacturing device in which a powder layer is formed and a liquid containing a binder is discharged from a nozzle to a shaping region of a three-dimensional shaped object in the powder layer to manufacture the three-dimensional shaped object. For example, JP-A-2019-1010 discloses a three-dimensional shaping device in which a layer is formed of a powder material and a curable liquid is discharged from a nozzle of a line head to the layer to manufacture a three-dimensional shaped object.

In the three-dimensional shaping device described in JP-A-2019-1010, a flushing stage for executing a flushing operation of discharging the curable liquid from the nozzle is formed. A foreign substance in the nozzle is removed by the flushing operation. In order to simplify the control during the flushing operation, the flushing operation is generally performed under discharge conditions similar to those of a case of shaping the three-dimensional shaped object, that is, a case where the liquid is discharged to a shaping region of the three-dimensional shaped object. However, in recent years, the three-dimensional shaped object is manufactured using various materials, and various kinds of powder are used. Therefore, depending on the powder to be used, a large amount of powder may float up and be mixed in the nozzle, and the powder mixed in the nozzle may not be removed even when the flushing operation is performed. When the powder mixed in the nozzle cannot be removed, liquid discharge failure or the like may occur.

SUMMARY

A three-dimensional shaped object manufacturing device according to the present disclosure includes: a shaping table; a layer forming portion configured to form a powder layer on the shaping table; a head configured to discharge, from a nozzle, a liquid containing a binder to a shaping region of a three-dimensional shaped object in the powder layer; and a control unit configured to control a movement of the head with respect to the shaping table and a drive of the head by applying a voltage, in which the control unit performs control to, after the liquid is discharged to the shaping region, execute a flushing operation of discharging the liquid from the nozzle to a flushing position different from the shaping region, and set an applied voltage during the flushing operation higher than an applied voltage when the liquid is discharged to the shaping region.

DESCRIPTION OF EXEMPLARY EMBODIMENTS

Figure 1:
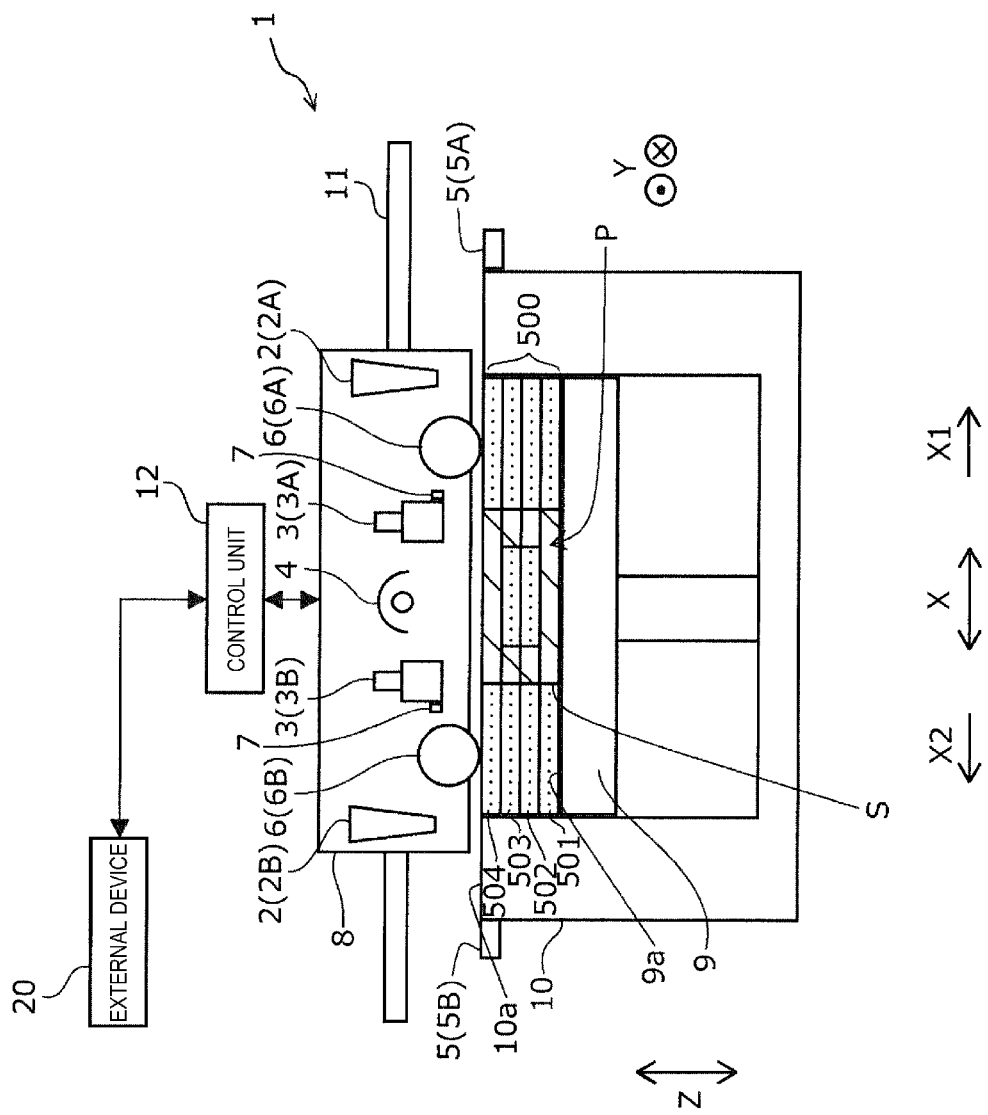
FIG. 1 is a schematic configuration diagram showing a three-dimensional shaped object manufacturing device according to an embodiment of the present disclosure.

First, the present disclosure will be schematically described.

A three-dimensional shaped object manufacturing device according to a first aspect of the present disclosure includes: a shaping table; a layer forming portion configured to form a powder layer on the shaping table; a head configured to discharge, from a nozzle, a liquid containing a binder to a shaping region of a three-dimensional shaped object in the powder layer; and a control unit configured to control a movement of the head with respect to the shaping table and a drive of the head by applying a voltage, in which the control unit performs control to, after the liquid is discharged to the shaping region, execute a flushing operation of discharging the liquid from the nozzle to a flushing position different from the shaping region, and set an applied voltage during the flushing operation higher than an applied voltage when the liquid is discharged to the shaping region.

According to this aspect, since the applied voltage during the flushing operation is set higher than the applied voltage when the three-dimensional shaped object is shaped, the powder mixed in the nozzle can be effectively removed by the flushing operation.

A three-dimensional shaped object manufacturing device according to a second aspect of the present disclosure includes: a shaping table; a layer forming portion configured to form a powder layer on the shaping table; a head configured to discharge, from a nozzle, a liquid containing a binder to a shaping region of a three-dimensional shaped object in the powder layer; and a control unit configured to control a movement of the head with respect to the shaping table and a drive of the head by applying a voltage, in which the control unit performs control to, after the liquid is discharged to the shaping region, execute a flushing operation of discharging the liquid from the nozzle to a flushing position different from the shaping region, and set a waveform of an applied voltage such that a liquid discharge amount per unit time during the flushing operation is larger than a liquid discharge amount per unit time when the liquid is discharged to the shaping region.

According to this aspect, since the liquid discharge amount per unit time during the flushing operation is set larger than the liquid discharge amount per unit time when the three-dimensional shaped object is shaped, the powder mixed in the nozzle can be effectively removed by the flushing operation.

In the three-dimensional shaped object manufacturing device according to a third aspect of the present disclosure according to the first aspect, the control unit controls a flushing operation time at the flushing position to be longer as an interval between the shaping region and the flushing position increases.

According to this aspect, the flushing operation time at the flushing position is made longer as the interval between the shaping region and the flushing position increases. That is, the flushing operation is carefully performed as a moving distance of a region where the powder may float increases. Therefore, the powder mixed in the nozzle can be particularly effectively removed by the flushing operation.

In the three-dimensional shaped object manufacturing device according to a fourth aspect of the present disclosure according to the third aspect, the control unit performs control to omit, when the interval is equal to or less than a predetermined length, executing the flushing operation by stopping the head at the flushing position.

According to this aspect, when the interval is equal to or less than the predetermined length, executing the flushing operation by stopping the head at the flushing position is omitted. Therefore, a decrease in a manufacturing speed of the three-dimensional shaped object caused by executing the flushing operation when a possibility of the powder being mixed into the nozzle is low can be prevented.

In the three-dimensional shaped object manufacturing device according to a fifth aspect of the present disclosure according to the first aspect, the control unit performs control to execute, before the liquid is discharged to the shaping region, a pre-shaping flushing operation at an applied voltage lower than the applied voltage when the liquid is discharged to the shaping region.

According to this aspect, the pre-shaping flushing operation is executed, before the three-dimensional shaped object is shaped, at the applied voltage lower than the applied voltage when the three-dimensional shaped object is shaped. Therefore, liquid discharge failure before the three-dimensional shaped object is shaped can be prevented, and the temperature of the head can be prevented from being excessively increased by executing the pre-shaping flushing operation at a low applied voltage when the three-dimensional shaped object is shaped.

In the three-dimensional shaped object manufacturing device according to a sixth aspect of the present disclosure according to the first aspect, the control unit is configured to move the head at different moving speeds with respect to the shaping table when the liquid is discharged to the shaping region, and controls the flushing operation time at the flushing position to be longer as the moving speed becomes fast.

According to this aspect, the flushing operation time at the flushing position is made longer as the moving speed of the head becomes fast. That is, the flushing operation is carefully performed when the moving speed of the head becomes fast and the powder easily floats up. Therefore, the powder mixed in the nozzle can be particularly effectively removed by the flushing operation.

The three-dimensional shaped object manufacturing device according to a seventh aspect of the present disclosure according to the first aspect further includes a temperature sensor configured to detect a temperature of the nozzle, in which the control unit controls to stop the head at the flushing position without executing the flushing operation until the temperature of the nozzle after executing the flushing operation is equal to or lower than a predetermined temperature.

According to this aspect, the head is stopped at the flushing position without executing the flushing operation until the temperature of the nozzle after executing the flushing operation is equal to or lower than the predetermined temperature. Therefore, even when the temperature of the head is increased with the flushing, the temperature of the head can be prevented from being excessively increased when the three-dimensional shaped object is shaped.

The three-dimensional shaped object manufacturing device according to an eighth aspect of the present disclosure according to the first aspect further includes a temperature sensor configured to detect a temperature of the nozzle, in which the control unit performs control to execute the flushing operation until the temperature of the nozzle is equal to or higher than a predetermined temperature.

When relatively low temperature powder is mixed into the nozzle, the temperature in the nozzle is lowered, so that the liquid in the nozzle is increased in viscosity. Due to the liquid increased in viscosity, the discharge failure may occur, and an accuracy of removing the powder from the nozzle may decrease. However, according to this aspect, since the flushing operation is executed until the temperature of the nozzle is equal to or higher than the predetermined temperature, it is possible to reduce the occurrence of the discharge failure and the decrease of the accuracy of removing the powder from the nozzle.

Embodiments of the present disclosure will be described below with reference to accompanying figures.

First, a three-dimensional shaped object manufacturing device 1 configured to execute a method for manufacturing a three-dimensional shaped object of the present disclosure according to an embodiment will be described with reference to FIG. 1. Here, in FIG. 1 and FIG. 2 to be described later, an X direction is a horizontal direction and corresponds to a reciprocating direction of a supply unit 8, and an X1 direction corresponds to a forward direction and an X2 direction corresponds to a backward direction. A Y direction is a horizontal direction and a direction orthogonal to the X direction, and corresponds to a direction in which a rotation shaft of a roller 6 extends. A Z direction is a vertical direction and corresponds to a stacking direction of layers 500.

The term "three-dimensional shaping" in this description refers to forming a so-called three-dimensional shaped object, and includes, for example, forming a shape having a thickness even in a shape of a flat plate shape that is a so-called two-dimensional shape.

The three-dimensional shaped object manufacturing device 1 according to the present embodiment is a three-dimensional shaped object manufacturing device that manufactures a three-dimensional shaped object by stacking layers 500 including a layer 501, a layer 502, a layer 503, . . . , and a layer 50*n*. As shown in FIG. 1, the three-dimensional shaped object manufacturing device 1 according to the present embodiment includes a table unit 10 that includes a shaping table 9, the supply unit 8 that supplies a shaping material of the three-dimensional shaped object to the shaping table 9, and a control unit 12 that controls operations of the table unit 10 and the supply unit 8. The three-dimensional shaped object manufacturing device 1 is electrically coupled to an external device 20 such as a personal computer, and is configured to receive an instruction from a user via the external device 20.

The shaping table 9 is configured to move in the Z direction under a control of the control unit 12. A shaping surface 9a of the shaping table 9 is disposed at a position lower than an upper surface portion 10a of the table unit 10 by a predetermined distance in the Z direction, and the shaping material of the three-dimensional shaped object is supplied from the supply unit 8 to the shaping surface 9a to form one layer of the layers 500. Then, stacking is performed by repeating a downward movement of the shaping table 9 by a predetermined distance and a supply of the shaping material of the three-dimensional shaped object from the supply unit 8. FIG. 1 shows a state where a structure S of the three-dimensional shaped object is formed on the shaping surface 9a by repeating a formation of four layers of the layer 501, the layer 502, the layer 503, and a layer 504.

The supply unit 8 is configured to move in the X direction along a guide bar 11. In addition, the supply unit 8 includes shaping material supply portions 2 configured to supply the shaping material including powder of metal, ceramics, resin, or the like to the shaping table 9. The shaping material supply portions 2 include a shaping material supply portion 2A formed at a head side end portion in the X1 direction and a shaping material supply portion 2B formed at a head side end portion in the X2 direction.

In addition, the supply unit 8 includes the rollers 6 configured to compress and level the shaping material supplied to the shaping table 9. The rollers 6 include a roller 6A formed next to the shaping material supply portion 2A in the X direction and a roller 6B formed next to the shaping material supply portion 2B in the X direction. In the three-dimensional shaped object manufacturing device 1, the shaping material supply portion 2 and the roller 6 constitute a layer forming portion that forms the layer 500 that is a powder layer on the shaping table 9.

In addition, the supply unit 8 includes heads 3 configured to discharge a liquid containing a binder for binding powder contained in the shaping material supplied from the shaping material supply portions 2 to a shaping region P of the three-dimensional shaped object. The heads 3 include a head 3A formed next to the roller 6A in the X direction and a head 3B formed next to the roller 6B in the X direction. Here, the liquids discharged from the head 3A and the head 3B are the same liquid, and are liquids containing an ultraviolet ray curable resin as the binder. However, the liquid is not limited to such a liquid, and a liquid containing a thermosetting resin as the binder, a liquid in a state where a solid resin as the binder is dissolved in a volatile solvent, or the like may be used. In the supply unit 8, temperature sensors 7 configured to detect a temperature of a nozzle of the head 3 are provided corresponding to the head 3A and the head 3B.

An ultraviolet ray irradiation portion 4 that performs irradiation with ultraviolet rays for curing the ultraviolet ray curable resin is provided between the head 3A and the head 3B in the X direction. The supply unit 8 according to the present embodiment includes one ultraviolet ray irradiation portion 4, but may include two or more ultraviolet ray irradiation portions 4, or according to a type of the liquid used, not include the ultraviolet ray irradiation portion 4, or include a heater for curing the thermosetting resin or volatilizing the solvent instead of the ultraviolet ray irradiation portion 4, or the like.

As shown in FIG. 1, in the supply unit 8 according to the present embodiment, shapes of structural members are symmetrical in the X direction. Therefore, the three-dimensional shaped object manufacturing device 1 according to the present embodiment can execute a shaping operation of the three-dimensional shaped object while moving the supply unit 8 in the X1 direction or while moving the supply unit 8 in the X2 direction.

As shown in FIG. 1, in the three-dimensional shaped object manufacturing device 1 according to the present embodiment, liquid receiving portions 5 are provided in the table unit 10, and a flushing operation can be executed by discharging a liquid from the head 3 to a position facing a liquid receiving portion 5. That is, the position facing the liquid receiving portion 5 is a flushing position, and therefore, the flushing position is certainly different from the shaping region P of the three-dimensional shaped object. The liquid receiving portions 5 include a liquid receiving portion 5A and a liquid receiving portion 5B.

Thus, the three-dimensional shaped object manufacturing device 1 according to the present embodiment includes the shaping table 9, the shaping material supply portions 2 and the rollers 6 as the layer forming portion forming the layer 500 that is a powder layer on the shaping table 9, the heads 3 configured to discharge, from a nozzle, a liquid containing a binder to the shaping region P of the three-dimensional shaped object in the layer 500, and the control unit 12 configured to control movements of the heads 3 with respect to the shaping table 9 and drives of the heads 3 by applying a voltage. After the liquid is discharged to the shaping region P, the control unit 12 applies a voltage to the head 3 at a flushing position different from the shaping region P to execute the flushing operation of discharging the liquid from the nozzle. In the three-dimensional shaped object manufacturing device 1 according to the present embodiment, although the position facing the liquid receiving portion 5 is defined as the flushing position, the flushing position is not limited to this, and, for example, a region different from the shaping region P on the shaping surface 9a may be used as a flushing position.

Next, a specific example of the shaping material that can be used in the three-dimensional shaped object manufacturing device 1 according to the present embodiment will be described. As metal powder that can be contained in the shaping material, for example, simple powder of magnesium (Mg), iron (Fe), cobalt (Co), chromium (Cr), aluminum (Al), titanium (Ti), copper (Cu), and nickel (Ni), or powder of alloys containing one or more of these metals (maraging steel, stainless steel (SUS), cobalt chromium molybdenum, titanium alloy, nickel alloy, aluminum alloy, cobalt alloy, and cobalt chromium alloy), and mixed powder thereof can be used.

In addition, as the ceramic powder that can be contained in the shaping material, for example, silicon dioxide, titanium dioxide, aluminum oxide, zirconium oxide, silicon nitride or the like can be preferably used.

As resin powder that can be used in the shaping material, or as a binder contained in the liquid, for example, acryl (PMMA), acrylonitrile-butadiene-acrylate (ABS), acrylonitrile-styrene-acrylate (ASA), polylactic acid (PLA), polyetherimide (PEI), polycarbonate (PC), polypropylene (PP), polyethylene (PE), polyamide (PA), epoxy (EP), polyphenylene sulfide (PPS), polystyrene (PS), paraffin wax, polyvinyl alcohol (PVA), carboxymethyl cellulose, polyoxymethylene, and polymethyl methacrylate can be preferably used. In addition, for example, an acrylic resin, an epoxy resin, a silicone resin, a cellulosic resin, or another synthetic resin can be used alone or in combination. Further, a thermoplastic resin, an ultraviolet ray curable resin of a type using radical polymerization of an unsaturated double bond such as acrylic or a type using cationic polymerization such as epoxy can also be used.

As a solvent contained in the liquid, for example, water, (poly)alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, isopropyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, and ionic liquids such as tetraalkylammonium acetates (such as tetrabutylammonium acetate) can be used, and one or two or more selected from these can be used in combination.

Figure 2:
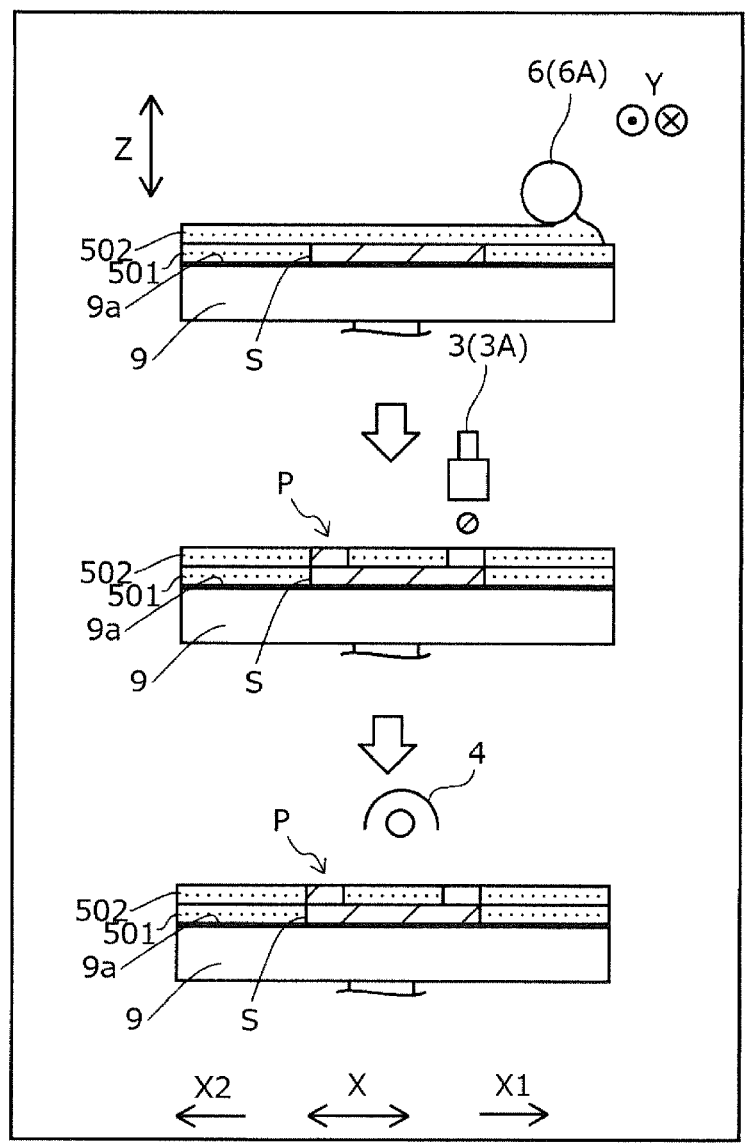
FIG. 2 is a schematic diagram showing a method for manufacturing a three-dimensional shaped object using the three-dimensional shaped object manufacturing device of FIG. 1.
Figure 3:
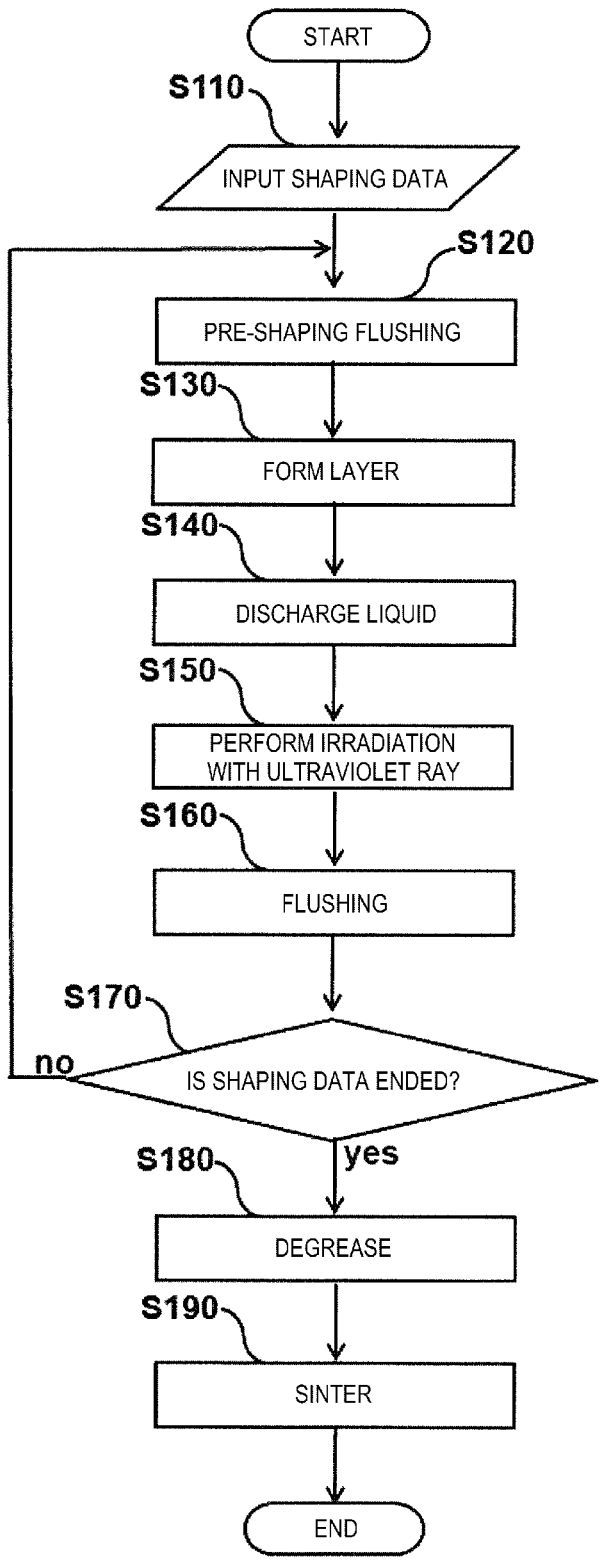
FIG. 3 is a flowchart of the method for manufacturing a three-dimensional shaped object using the three-dimensional shaped object manufacturing device of FIG. 1.

Next, an example of a method for manufacturing a three-dimensional shaped object configured to be executed using the three-dimensional shaped object manufacturing device 1 will be described with reference to FIG. 2 and a flowchart of FIG. 3. The method for manufacturing a three-dimensional shaped object according to the present embodiment shown by the flowchart of FIG. 3 is performed by the control unit 12 performing control of the structural members of the three-dimensional shaped object manufacturing device 1 such as the supply unit 8 and the shaping table 9. FIG. 2 shows an example when forming the layer 502 of the layers 500.

In the method for manufacturing the three-dimensional shaped object according to the present embodiment, as shown in FIG. 3, first, in a shaping data input step of step S110, shaping data of the three-dimensional shaped object to be manufactured is input. An input source of the shaping data of the three-dimensional shaped object is not particularly limited, and the shaping data can be input to the three-dimensional shaped object manufacturing device 1 using the external device 20.

Next, in a pre-shaping flushing step of step S120, a pre-shaping flushing of the head 3 is performed. Here, when the supply unit 8 moves in the X1 direction to form the layer 500, a pre-shaping flushing of the head 3A is performed at a position facing the liquid receiving portion 5B. On the other hand, when the supply unit 8 moves in the X2 direction to form the layer 500, a pre-shaping flushing of the head 3B is performed at a position facing the liquid receiving portion 5A. The pre-shaping flushing step of step S120 may be omitted.

Next, in a layer forming step of step S130, the shaping material is supplied from the shaping material supply portion 2 to the shaping surface 9a of the shaping table 9 and is compressed and leveled by the roller 6 to form the layer 500. An uppermost state diagram of FIG. 2 shows a state where the supply unit 8 moves in the X1 direction to form the layer 502. Here, when the supply unit 8 moves in the X1 direction to form the layer 500, the shaping material is supplied from the shaping material supply portion 2A and is compressed and leveled by the roller 6A to form the layer 500. On the other hand, when the supply unit 8 moves in the X2 direction to form the layer 500, the shaping material is supplied from the shaping material supply portion 2B and is compressed and leveled by the roller 6B to form the layer 500.

Next, in a liquid discharge step of step S140, the head 3 discharges, from the nozzle, the liquid containing the binder to the shaping region P of the three-dimensional shaped object in the layer 500. A second state diagram from a top of FIG. 2 shows a state where the liquid is discharged from the nozzle of the head 3 to the shaping region P of the layer 502 while the supply unit 8 moves in the X1 direction. Here, when the supply unit 8 moves in the X1 direction to form the layer 500, the head 3A discharges the liquid. On the other hand, when the supply unit 8 moves in the X2 direction to form the layer 500, the head 3B discharges the liquid.

Next, in an ultraviolet ray irradiation step of step S150, the ultraviolet ray irradiation portion 4 irradiates the shaping region P of the three-dimensional shaped object in the layer 500 with ultraviolet rays. A lowermost state diagram of FIG. 2 shows a state where the ultraviolet ray irradiation portion 4 irradiates the shaping region P of the three-dimensional shaped object in the layer 502 with the ultraviolet rays while the supply unit 8 moves in the X1 direction.

Next, in a flushing step of step S160, a flushing of the head 3 is performed. Here, when the supply unit 8 moves in the X1 direction to form the layer 500, a flushing of the head 3A is performed at a position facing the liquid receiving portion 5A. On the other hand, when the supply unit 8 moves in the X2 direction to form the layer 500, a flushing of the head 3B is performed at a position facing the liquid receiving portion 5B.

Then, in a shaping data end determination step of step S170, the control unit 12 of the three-dimensional shaped object manufacturing device 1 determines whether the formation of all the layers 500 based on the shaping data input in step S110 is ended. When the control unit 12 determines that the formation of all the layers 500 is not ended, the processing returns to the pre-shaping flushing step of step S120 to form the next layer 500. On the other hand, when the control unit 12 determines that the formation of all the layers 500 is ended, the processing proceeds to a degreasing step of step S180.

In the degreasing step of step S180, a resin component of the structure S manufactured by repeating the processing from the pre-shaping flushing step of step S120 to the shaping data end determination step of step S170, such as a binder, is degreased using an external device or the like. A degreasing method includes, but is not limited to, a method of volatilizing the resin component by heating, and a method of immersing the structure S in a solvent to dissolve the resin component. The degreasing step of step S180 may be omitted depending on a type of the three-dimensional shaped object to be manufactured, for example, when a three-dimensional shaped object made of resin is manufactured.

Then, in a sintering step of step S190, the structure S degreased in the degreasing step in step S180 is heated using an external device or the like to sinter the shaping material. Even when the resin component such as a binder remains in the structure S after the degreasing step of step S180, the resin component is removed by executing the sintering step of step S190. Then, with the sintering step being ended in the step S190, the method for manufacturing a three-dimensional shaped object according to the present embodiment is ended. The sintering step of step S190 may be omitted depending on the type of the three-dimensional shaped object to be manufactured, similar as the degreasing step of step S180.

Figure 4:
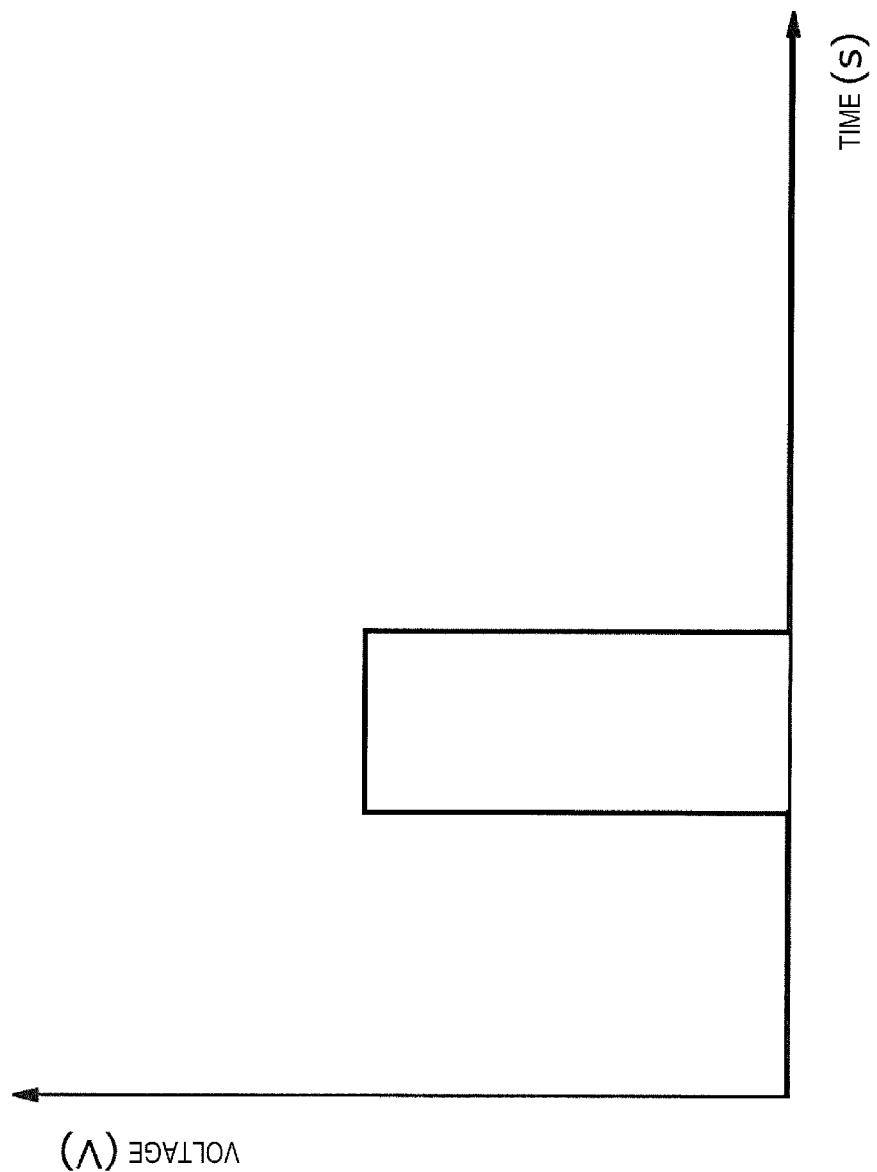
FIG. 4 is a graph showing an example of a waveform of a voltage applied to ahead in the three-dimensional shaped object manufacturing device of FIG. 1 when a liquid is discharged to a shaping region.

Here, an example of a waveform of an applied voltage to the head 3 in the liquid discharge step of step S140 and a waveform of an applied voltage to the head 3 in the flushing step of step S160 will be described with reference to FIGS. 4 and 5. Here, FIG. 4 is a graph showing an example of the waveform of the voltage applied to the head 3 when the liquid is discharged to the shaping region P, that is, in the liquid discharging step of step S140. Here, FIG. 5 is a graph showing an example of the waveform of the voltage applied to the head 3 during the flushing operation, that is, in the flushing step of step S160.

Figure 5:
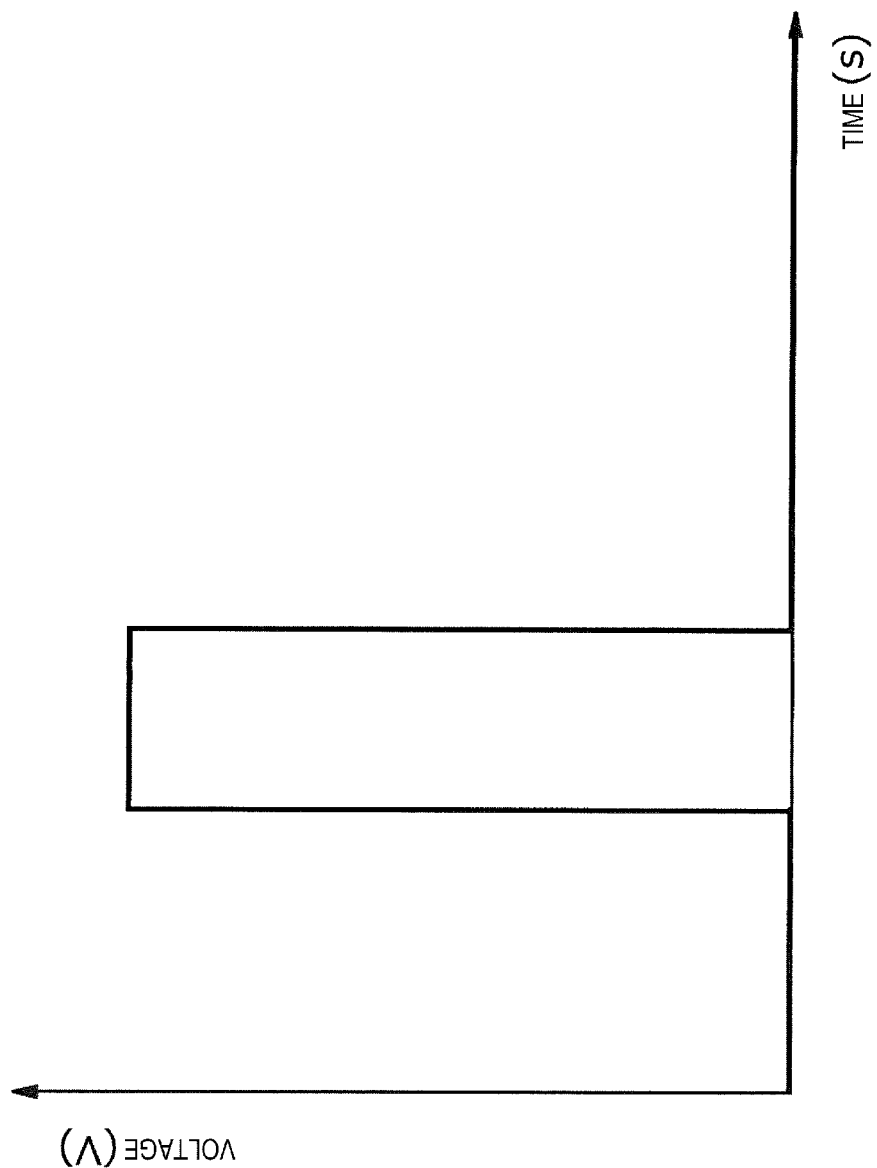
FIG. 5 is a graph showing an example of a waveform of a voltage applied to the head in the three-dimensional shaped object manufacturing device of FIG. 1 during a flushing operation.

As is clear from a comparison between the waveform shown in FIG. 4 and the waveform shown in FIG. 5, the three-dimensional shaped object manufacturing device 1 of the present embodiment can make, under the control of the control unit 12, the applied voltage during the flushing operation higher than the applied voltage when the liquid is discharged to the shaping region P. Thus, by making the applied voltage during the flushing operation higher than the applied voltage when shaping the three-dimensional shaped object, the powder mixed in the nozzle can be effectively removed together with the liquid containing the binder.

Next, another example of the waveform of the applied voltage to the head 3 in the flushing step of step S160 will be described with reference to FIG. 6. Here, FIG. 6 is a graph showing the waveform of the voltage applied to the head 3 during the flushing operation, that is, in the flushing step of step S160, and is a graph showing an example of a waveform different from the waveform in FIG. 5.

Figure 6:
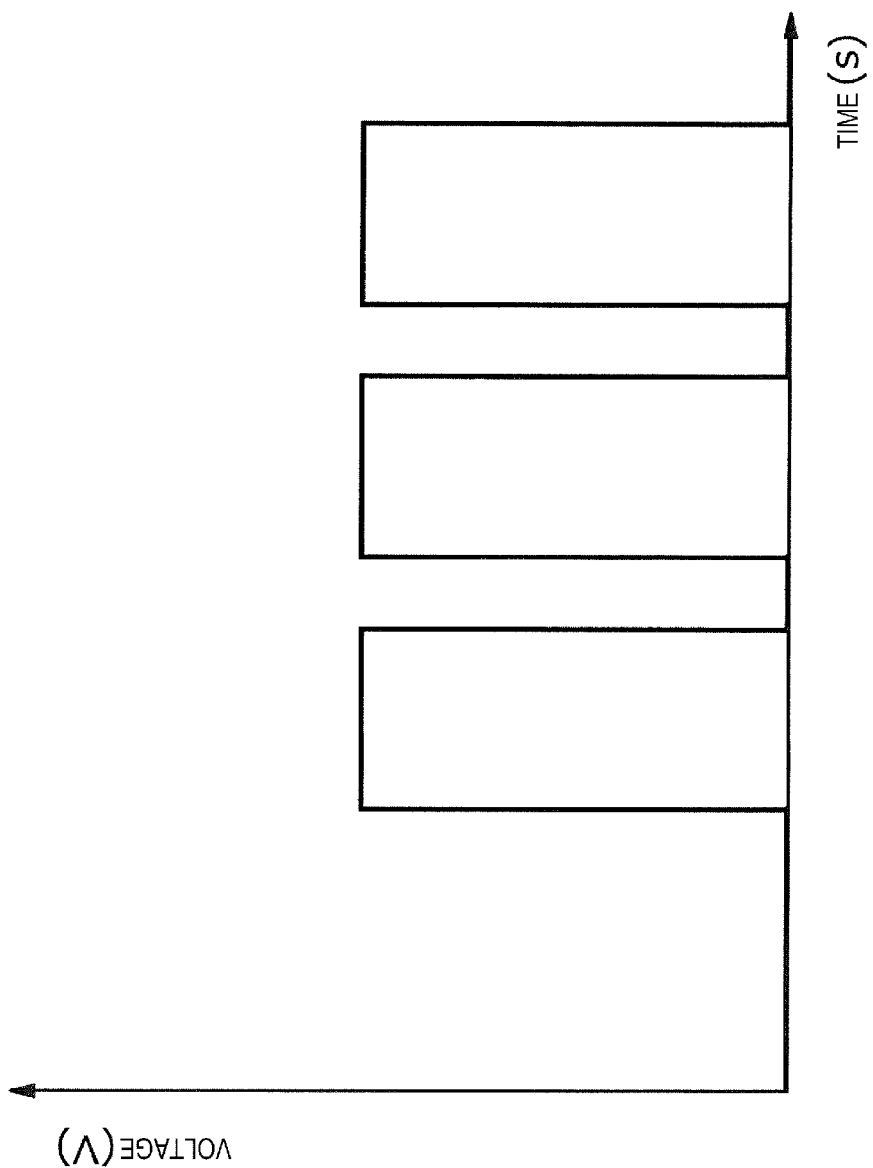
FIG. 6 is a graph showing another example of a waveform of a voltage applied to the head in the three-dimensional shaped object manufacturing device of FIG. 1 during the flushing operation.

As is clear from a comparison between the waveform shown in FIG. 4 and the waveform shown in FIG. 6, the three-dimensional shaped object manufacturing device 1 according to the present embodiment can set, under the control of the control unit 12, the waveform of the applied voltage during the flushing operation to a waveform in which the applied voltage when the liquid is discharged to the shaping region P is continuously applied three times. The three-dimensional shaped object manufacturing device 1 according to the present embodiment is configured to discharge the liquid as liquid droplets, whereas by making the waveform of the applied voltage during the flushing operation to such a waveform, it is possible to make one droplet discharged during the flushing operation larger than one droplet discharged when the liquid is discharged to the shaping region P. This is because, as shown in FIG. 6, by forming the waveform in which the voltage is continuously applied three times, approximately three droplets are stuck and discharged as one droplet. Thus, the three-dimensional shaped object manufacturing device 1 according to the present embodiment can form, under the control of the control unit 12, a waveform of an applied voltage such that a liquid discharge amount per unit time during the flushing operation is larger than a liquid discharge amount per unit time when the liquid is discharged to the shaping region P.

Thus, by making the liquid discharge amount per unit time during the flushing operation larger than the liquid discharge amount per unit time when shaping the three-dimensional shaped object, the powder mixed in the nozzle can be effectively removed by the flushing operation. Here, the term "liquid discharge amount per unit time" corresponds to, for example, an amount of one liquid droplet when the liquid is discharged in a liquid droplet state at a predetermined frequency in the three-dimensional shaped object manufacturing device 1 according to the present embodiment. On the other hand, the term "liquid discharge amount per unit time" corresponds to, when the liquid is continuously discharged instead of being in the liquid droplet state, a flow rate per unit time.

In the three-dimensional shaped object manufacturing device 1 according to the present embodiment, the control unit 12 can control a flushing operation time at the flushing position in the flushing step of step S160 to be longer as an interval between the shaping region P according to a size of the structure S and a shaping position and the flushing position that is a position facing the liquid receiving portion 5 increases. As the interval between the shaping region P and the flushing position increases, a moving distance of the head 3 in a region where the powder may float increases, whereas the three-dimensional shaped object manufacturing device 1 according to the present embodiment can carefully perform the flushing operation as the moving distance of the region where the powder may float increases. Therefore, the three-dimensional shaped object manufacturing device 1 according to the present embodiment can particularly effectively remove the powder mixed in the nozzle by the flushing operation.

On the other hand, the three-dimensional shaped object manufacturing device 1 according to the present embodiment can omit, under the control of the control unit 12, when the interval between the shaping region P and the flushing position is equal to or less than a predetermined length, executing the flushing operation by stopping the head 3 at the flushing position. Therefore, the three-dimensional shaped object manufacturing device 1 according to the present embodiment can prevent a decrease in a manufacturing speed of the three-dimensional shaped object caused by executing the flushing operation by stopping the head 3 when a possibility of the powder being mixed into the nozzle is low and the flushing operation is not necessary. Here, the phrase "omit executing the flushing operation by stopping the head 3 at the flushing position" includes not only performing no flushing operation at all, but also executing the flushing operation without stopping the head 3 at the flushing position, for example, discharging a few drops of liquid toward the liquid receiving portion 5 while moving the head 3.

As described above, the three-dimensional shaped object manufacturing device 1 according to the present embodiment is configured to execute the pre-shaping flushing step of step S120. Specifically, as the pre-shaping flushing step of step S120, the three-dimensional shaped object manufacturing device 1 according to the present embodiment can execute, under the control of the control unit 12, a pre-shaping flushing operation at an applied voltage lower than the applied voltage when the liquid is discharged to the shaping region P before the liquid is discharged to the shaping region P. Therefore, the three-dimensional shaped object manufacturing device 1 according to the present embodiment can prevent liquid discharge failure before the three-dimensional shaped object is shaped, and can prevent the temperature of the head 3 from being excessively increased by executing the pre-shaping flushing operation at a low applied voltage when shaping the three-dimensional shaped object. When the temperature of the head 3 is excessively increased, the liquid discharge failure or the like may occur. The three-dimensional shaped object manufacturing device 1 according to the present embodiment performs the pre-shaping flushing at a position facing the liquid receiving portion 5 as described above, but is not limited to such a configuration, and for example, may perform the pre-shaping flushing in a region different from the shaping region P on the shaping surface 9a.

The three-dimensional shaped object manufacturing device 1 according to the present embodiment is configured to execute a plurality of shaping modes, and can move, under the control of the control unit 12, the supply unit 8 in the X direction at different moving speeds when the liquid is discharged to the shaping region P according to a shaping mode to be executed. That is, the control unit 12 can move the head 3 at different moving speeds with respect to the shaping table 9 when the liquid is discharged to the shaping region P. Then, the control unit 12 can control the flushing operation time at the flushing position to be longer as the moving speed of the head 3 becomes fast. Powder of the layer 500 easily floats up when the moving speed of the head 3 becomes fast, whereas the three-dimensional shaped object manufacturing device 1 according to the present embodiment can carefully perform the flushing operation under conditions where the moving speed of the head 3 becomes fast and the powder easily floats up. Therefore, the three-dimensional shaped object manufacturing device 1 according to the present embodiment can particularly effectively remove the powder mixed in the nozzle by the flushing operation.

The temperature of the nozzle increases with the drive of the head 3 such as the discharge of the liquid to the shaping region P and the flushing operation. Thus, as described above, the three-dimensional shaped object manufacturing device 1 according to the present embodiment includes the temperature sensors 7 configured to detect the temperature of the nozzle. The control unit 12 can control to stop the head 3 at the flushing position without executing the flushing operation until the temperature of the nozzle after executing the flushing operation is equal to or lower than a predetermined upper limit temperature. Therefore, the three-dimensional shaped object manufacturing device 1 according to the present embodiment can prevent, even when the temperature of the head 3 is increased with the flushing, the temperature of the head 3 from being excessively increased when discharging the liquid to the shaping region P that is a time of shaping the three-dimensional shaped object.

The control unit 12 can also perform control to execute the flushing operation until the temperature of the nozzle is equal to or higher than a predetermined lower limit temperature. When relatively low temperature powder is mixed into the nozzle, the temperature in the nozzle is lowered, so that the liquid in the nozzle may increase in viscosity, the discharge failure may occur, and an accuracy of removing the powder may decrease. However, since the three-dimensional shaped object manufacturing device 1 according to the present embodiment can execute no flushing operation until the temperature of the nozzle is equal to or higher than the predetermined lower limit temperature, it is possible to reduce the occurrence of the discharge failure and the decrease of the accuracy of removing the powder.

The present disclosure is not limited to the embodiments described above, and may be implemented by various configurations without departing from the scope thereof. For example, in order to solve some or all of problems described above, or to achieve some or all of effects described above, technical characteristics in the embodiments corresponding to the technical characteristics in each embodiment described in the summary of the disclosure can be replaced or combined as appropriate. If the technical characteristics are not described as essential in the present description, they can be deleted as appropriate.

What is claimed is:

1. A three-dimensional shaped object manufacturing device, comprising:
   a shaping table;
   a layer forming portion configured to form a powder layer on the shaping table;
   a head configured to discharge, from a nozzle, a liquid containing a binder to a shaping region of a three-dimensional shaped object in the powder layer; and
   a control unit configured to control a movement of the head with respect to the shaping table and a drive of the head by applying a voltage, wherein
   the control unit is configured to:
      execute, after the liquid is discharged to the shaping region, a flushing operation of discharging the liquid from the nozzle to a flushing position different from the shaping region,
      set an applied voltage during the flushing operation higher than an applied voltage when the liquid is discharged to the shaping region, and
      change a flushing operation time at the flushing position to be longer as an interval between the shaping region and the flushing position increases according to a change in a size of a structure formed in the shaping region.

2. The three-dimensional shaped object manufacturing device according to claim 1, wherein
   the control unit is configured to omit, when the interval is equal to or less than a predetermined length, executing the flushing operation by stopping the head at the flushing position.

3. The three-dimensional shaped object manufacturing device according to claim 1, wherein
   the control unit is configured to execute, before the liquid is discharged to the shaping region, a pre-shaping flushing operation at an applied voltage lower than the applied voltage when the liquid is discharged to the shaping region.

4. The three-dimensional shaped object manufacturing device according to claim 1, wherein
   the control unit is configured to move the head at different moving speeds with respect to the shaping table when the liquid is discharged to the shaping region, and controls the flushing operation time at the flushing position to be longer as a moving speed of the head increases.

5. The three-dimensional shaped object manufacturing device according to claim 1, further comprising:
   a temperature sensor configured to detect a temperature of the nozzle, wherein
   the control unit is configured to stop the head at the flushing position without executing the flushing operation until the temperature of the nozzle after executing the flushing operation is equal to or lower than a predetermined temperature.

6. The three-dimensional shaped object manufacturing device according to claim 1, further comprising:
   a temperature sensor configured to detect a temperature of the nozzle, wherein
   the control unit is configured to execute the flushing operation until the temperature of the nozzle is equal to or higher than a predetermined temperature.

* * * * *